(12) United States Patent
Temple-Wilson (10) Patent No.: US 6,540,237 B1
(45) Date of Patent: Apr. 1, 2003

(54) CHUCK

(75) Inventor: Richard E. Temple-Wilson, South Yorkshire (GB)

(73) Assignee: Power Tool Holders Incorporated, Christiana, DE (US)

( * ) Notice: Subject to any disclaimer, the term of this patent is extended or adjusted under 35 U.S.C. 154(b) by 10 days.

(21) Appl. No.: 09/602,035

(22) Filed: Jun. 23, 2000

(51) Int. Cl.⁷ ............................................... B23B 31/12
(52) U.S. Cl. ........................................ 279/62; 279/902
(58) Field of Search ............................ 279/60–63, 902

(56) References Cited

U.S. PATENT DOCUMENTS

| | | |
|---|---|---|
| 573,189 A | 12/1896 | Vogel |
| 911,012 A | 1/1909 | Jacobs |
| 1,369,412 A | 2/1921 | Englund |
| 2,292,470 A | 8/1942 | Ostberg |
| 2,684,856 A | 7/1954 | Stoner |
| 2,928,680 A | 3/1960 | Sattler |
| 3,610,641 A | 10/1971 | Ryder |
| 3,702,705 A | 11/1972 | Schadlich |
| 3,807,745 A | 4/1974 | Bent |
| 3,949,998 A | 4/1976 | Dietzen et al. |
| 4,170,366 A | 10/1979 | Alessio |
| 4,252,333 A | 2/1981 | Vogel |
| 4,275,893 A | 6/1981 | Bilanceri |
| 4,305,597 A | 12/1981 | McCarty |
| 4,423,881 A | 1/1984 | Whitehead |
| 4,627,627 A | 12/1986 | Rohm |
| 4,648,608 A | 3/1987 | Smith |
| 4,660,841 A | 4/1987 | Chouinard |
| 4,664,394 A | 5/1987 | Theissig et al. |
| 4,695,066 A | 9/1987 | Rohm |
| 4,700,956 A | 10/1987 | Rohm |
| 4,804,048 A | 2/1989 | Porth, Jr. |
| 4,840,387 A | 6/1989 | McCarthy |
| 4,951,955 A | 8/1990 | Sakamaki |
| 4,991,860 A | 2/1991 | Rohm |
| 5,009,439 A | 4/1991 | Sakamaki |
| 5,016,892 A | 5/1991 | Lafforgue et al. |
| 5,125,673 A | 6/1992 | Huff et al. |
| 5,135,241 A | 8/1992 | Huff et al. |
| 5,145,192 A | 9/1992 | Rohm |
| 5,145,193 A | 9/1992 | Rohm |
| 5,145,194 A | 9/1992 | Huff et al. |
| 5,158,306 A | 10/1992 | Rohm |
| 5,183,274 A | 2/1993 | Sakamaki |
| 5,193,824 A | 3/1993 | Salpaka |

(List continued on next page.)

FOREIGN PATENT DOCUMENTS

| | | |
|---|---|---|
| DE | 4023304 C1 | 9/1991 |
| DE | 4238503 | 11/1993 |
| DE | 19506708 C1 | 3/1996 |
| DE | 29600727 U1 | 4/1996 |
| DE | 4438991 A1 | 5/1996 |
| EP | 0468128 A1 | 1/1992 |

(List continued on next page.)

Primary Examiner—Steven C. Bishop
(74) Attorney, Agent, or Firm—Nelson Mullins Riley & Scarborough, LLP (57) ABSTRACT

A chuck for use with a manual or powered driver includes a generally cylindrical body having a nose section and a tail section. The tail section is adapted to rotate with the drive shaft. The nose section defines an axial bore with angular passageways for receipt of chuck jaws. The chuck includes a generally cylindrical sleeve in driving engagement with a nut mounted about the chuck body so that when the sleeve is rotated with respect to the body, the jaws will be moved thereby. The jaws are slidably positioned in the passageways and include a tool engaging face and threads on the opposite side thereof to engage threads on the nut. The body includes a thrust bearing ring received by the nut so that the thrust ring holds the nut against forward and rearward axial movement with respect to the body.

11 Claims, 6 Drawing Sheets

U.S. PATENT DOCUMENTS

| | | |
|---|---|---|
| 5,253,879 A | 10/1993 | Huff et al. |
| 5,299,814 A | 4/1994 | Salpaka |
| 5,330,204 A | 7/1994 | Huff et al. |
| 5,348,317 A | 9/1994 | Steadings et al. |
| 5,348,318 A | 9/1994 | Steadings et al. |
| 5,390,940 A | 2/1995 | Morlino et al. |
| 5,409,243 A | 4/1995 | Shadeck et al. |
| 5,431,419 A | 7/1995 | Mack |
| 5,431,420 A | 7/1995 | Huff et al. |
| 5,452,906 A | 9/1995 | Huff et al. |
| 5,458,345 A | 10/1995 | Amyot |
| 5,465,983 A | 11/1995 | Owens et al. |
| 5,470,084 A | 11/1995 | Reibetanz et al. |
| 5,476,273 A | 12/1995 | Shadeck et al. |
| 5,499,829 A | 3/1996 | Rohm |
| 5,499,830 A | 3/1996 | Schnizler |
| 5,501,473 A | 3/1996 | Barton et al. |
| 5,501,555 A | 3/1996 | Muetschele et al. |
| 5,531,461 A | 7/1996 | Huff et al. |
| 5,553,873 A | 9/1996 | Salpaka et al. |
| 5,580,197 A | 12/1996 | Rohm |
| 5,590,985 A | 1/1997 | Mack |
| 5,624,125 A | 4/1997 | Rohm |
| 5,709,392 A | 1/1998 | Barton et al. |
| 5,732,956 A | 3/1998 | Huff et al. |
| 5,765,839 A | 6/1998 | Rohm |
| 5,816,583 A | 10/1998 | Middleton |
| 5,934,689 A * | 8/1999 | Montjoy ..................... 279/62 |
| 6,102,411 A | 8/2000 | Wilson |
| 6,260,856 B1 * | 7/2001 | Temple-Wilson ............ 279/62 |

FOREIGN PATENT DOCUMENTS

| | | |
|---|---|---|
| EP | 0618029 A1 | 10/1994 |
| EP | 0710519 A2 | 4/1995 |
| EP | 0710520 A2 | 4/1995 |
| EP | 0677348 A1 | 10/1995 |
| GB | 1565048 | 4/1980 |
| JP | 4365504 | 12/1992 |
| WO | 8903267 | 4/1989 |
| WO | 9706912 | 2/1997 |

* cited by examiner

CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screw drivers, nut drivers, burrs, mounted grinding stones and other cutting or abrading tools. Since the tools may have shanks of varying diameter, or the cross-section of the tool shank may be polygonal, the device is usually provided with a chuck which is adjustable over a relatively wide range. The chuck may be attached to the driver by a threaded or tapered bore.

A wide variety of chucks have been developed in the art. In one form of chuck, three jaws spaced circumferentially approximately 120 degrees apart from each other are constrained by angularly disposed passageways in a body attached onto the drive shaft. The chuck is configured so that rotation of the body in one direction relative to a constrained nut engaging the jaws forces the jaws into gripping relationship with respect to the cylindrical shank of a tool, while rotation in the opposite direction releases the gripping relationship. Such a chuck may be keyless if it is rotated by hand. One example of such a chuck is disclosed in U.S. Pat. No. 5,501,473 entitled "Chuck," commonly assigned to the present assignee, and the entire disclosure of which is incorporated by reference herein.

Various configurations of keyless chucks are known in the art and are desirable for a variety of applications.

SUMMARY OF THE INVENTION

The present invention recognizes and addresses the foregoing considerations, and others, of prior art constructions and methods. Accordingly, it is an object of the present invention to provide an improved chuck for use with a manual or powered driver.

This and other objects are achieved by a chuck for use with a manual or powered driver having a rotatable drive shaft. The chuck includes a generally cylindrical body having a nose section and a tail section. The tail section is adapted to rotate with the drive shaft. The nose section has an axial bore formed therein and a plurality of angularly disposed passageways formed therethrough and intersecting the axial bore. A thrust bearing ring is fixed on the body between the nose section and the tail section. A plurality of jaws are slidably positioned in the passageways. Each jaw has threads formed on one side thereof and a tool engaging surface formed on the opposite side thereof. A nut is rotatably mounted about the body and is in engagement with the jaw threads so that rotation of the nut with respect to the body moves the jaws within the passageways. The nut receives the thrust ring so that the thrust ring holds the nut against forward and rearward axial movement with respect to the body. The chuck also includes a generally cylindrical sleeve in driving engagement with the nut.

The accompanying drawings, which are incorporated in and constitute a part of the specification, illustrate one or more embodiments of the invention and, together with the description, serve to explain the principles of the invention.

Repeat use of reference characters in the present specification and drawings is intended to represent the same or analogous features or elements of the invention.

DETAILED DESCRIPTION OF PREFERRED EMBODIMENTS

Reference will now be made in detail to preferred embodiments of the invention, one or more examples of which are illustrated in the accompanying drawings. Each example is provided by way of explanation of the invention, not limitation of the invention. In fact, it will be apparent to those of ordinary skill in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the spirit of the appended claims and their equivalents.

Figure 1:
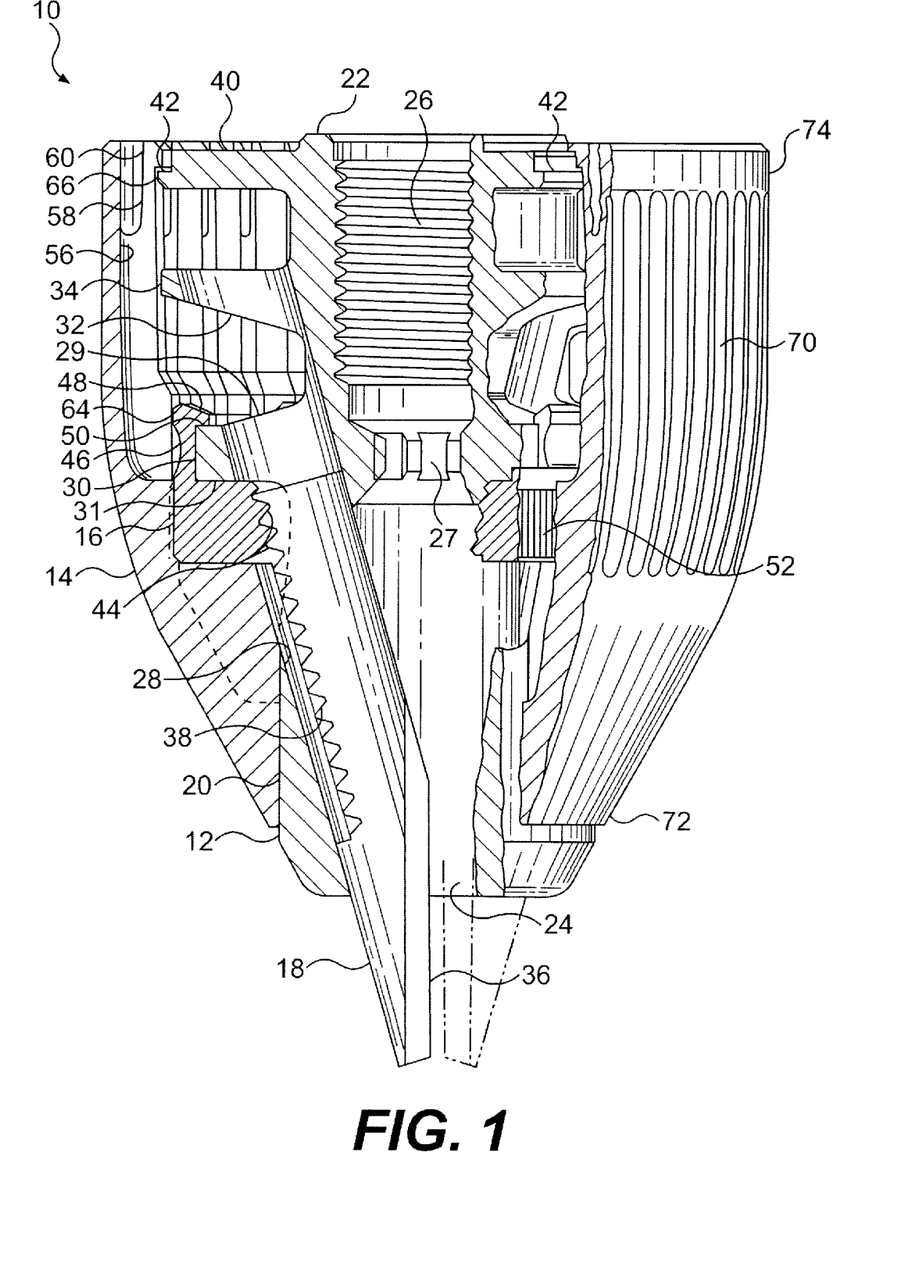
FIG. 1 is a longitudinal view, partly in section, of a chuck in accordance with an embodiment of the present invention.

FIG. 1 illustrates a chuck 10 in accordance with an embodiment of the present invention. Chuck 10 includes a generally cylindrical body 12, a generally cylindrical sleeve 14, a nut 16, and a plurality of jaws 18. Body 12 defines a nose section 20 and a tail section 22. An axial bore 24 is formed in the nose section. Axial bore 24 is somewhat larger than the largest tool shank the chuck is designed to accommodate.

A threaded bore 26 is formed in tail section 22 and is of a standard size to mate and rotate with a drive shaft of a powered or manual driver (not shown). While a threaded bore 26 is illustrated, any suitable method of securing the chuck to a driver may be employed. For example, the threaded bore could be replaced with a tapered bore of standard size to mate with a tapered drive shaft. Additionally, tail section 22 may be formed integrally with the drive shaft. Chuck body 12 may be formed from steel bar stock or other suitable material.

Bores 24 and 26 may communicate at a central region 27 of body 12. Central region 27 may be formed with a socket to accept a drive bit so that the body may be screwed onto the spindle by the bit. Such a socket configuration is described in U.S. Pat. No. 5,193,824, entitled "Chuck Having a Drive Bit Socket," commonly assigned to the present assignee and the entire disclosure of which is incorporated by reference herein.

Passageways 28 are formed through body nose section 20. A thrust bearing ring 30 on body 12 defines corresponding passageways 29 to accommodate each jaw. Thrust ring 30 may be a separate component from body 12. However, in the illustrated embodiments, the thrust ring is formed integrally with the body and includes an axially forward facing thrust surface 31 for receipt of nut 16. An intermediate radial body flange 34 on body 12 defines rear passageways 32 that provide added stabilization to each jaw 18 when the jaws are in the fully opened position. Although illustrated as an integral component with body 12, the intermediate radial flange may be a separate component from the body.

Preferably, three jaws 18 are employed, and each jaw 18 is separated from the adjacent jaw by an arc of approximately 120 degrees. The axes of corresponding passageways 28, 29, and 32 and the jaws 18 are angled with respect to the chuck axis and intersect the chuck axis at a common point ahead of the chuck body. Each jaw 18 has a tool engaging face 36 on one side and threads 38 on its opposite outer surface. Threads 38 of any suitable type and pitch may be utilized within the scope of the present invention as should be understood by those of ordinary skill in the art.

In the embodiment illustrated in FIG. 1, body 12 defines on its rearward or tail section 22 a retaining ring, for example a radial flange 40, which preferably also includes an axially rearward facing ledge portion 42. Ledge portion 42 is axially rearward of an outer circumferential surface 66 on flange 40. Flange 40 may be a separate component from body 12.

In the embodiment illustrated in FIG. 1, sleeve 14 is generally cylindrical and includes a nose or forward section 72 and a tail or rearward section 74. Sleeve 14 is fixed to nut 16 and is received on body 12 so that it is rotatable about the chuck body.

Nut 16 is a one-piece nut defining threads 44 on an inner circumferential surface for mating with jaw threads 38 so that rotation of the nut with respect to the body causes the jaws to be advanced or retracted in passageways 28, 29 and 32, depending upon the nut's rotational direction. As shown in FIGS. 1–4, 6 and 7, nut 16 also defines a plurality of axially rearward extending protrusions 46. Each protrusion 46 defines a radially inward projecting tab 48 on its rearward portion. Nut tabs 48 engage an axially rearward facing surface 50 on thrust ring 30 to hold the nut axially with respect to body 12.

Figure 3A:
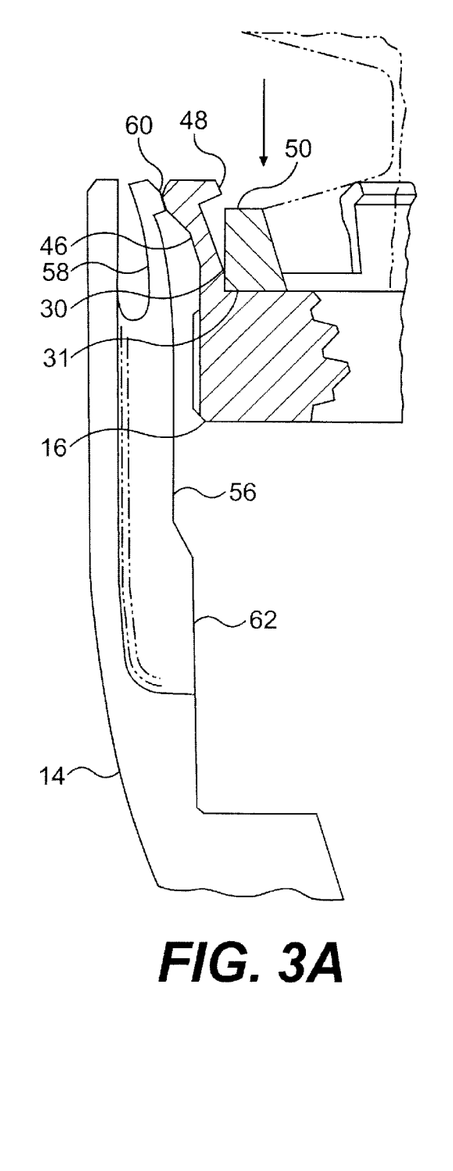
FIG. 3A is a partial cross-sectional view of the sleeve, the nut, a and the thrust ring of the chuck as in FIG. 1.
Figure 3B:
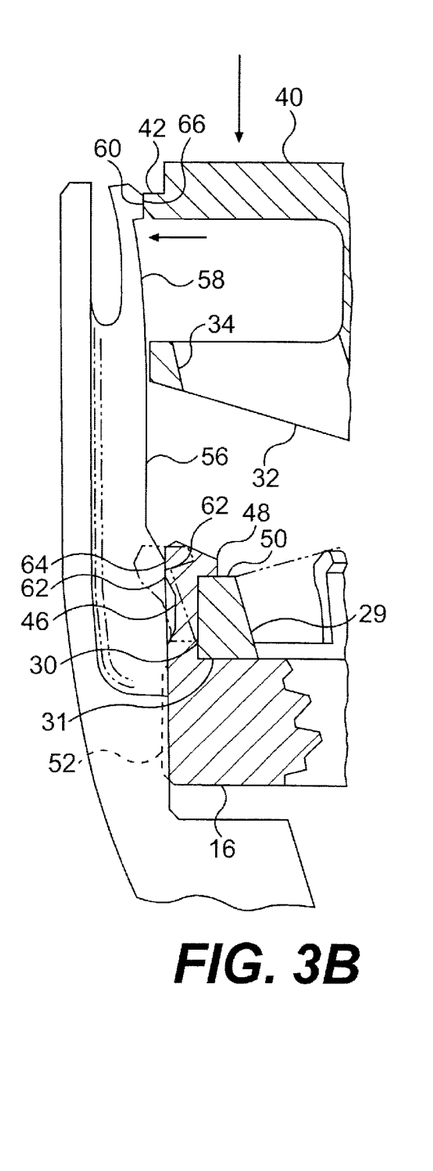
FIG. 3B is a partial cross-sectional view of the sleeve, the nut, and the body of the chuck as in FIG. 1.

As shown in FIG. 3A, protrusions 46 are biased radially outward. As sleeve 14 slides axially rearward over nut 16 during assembly, sleeve protrusions 58 initially flex outward as they pass over nut protrusions 46 and tabs 48. Referring to FIG. 3B, as sleeve 14 slides further onto body 12, a cam surface 62 defined on surface 56 engages a radially outward facing surface 64 on nut protrusions 46 and pushes tabs 48 radially inward so that the tabs engage surface 50 on thrust ring 30. Simultaneously, sleeve protrusions 58 flex radially outward as sleeve tabs 60 pass over outer circumferential surface 66 on body rear flange 40, enabling sleeve tabs 60 to engage ledge portion 42. It should be understood that there may be some radially inward movement of nut protrusions 46 and tabs 48 when the sleeve protrusions 58 and 58' (see FIGS. 6 and 7) and sleeve tabs 60 and 60' pass around the nut tabs, depending upon the hardness of the particular nut tab. It should also be understood that nut tabs 48 could be crimped onto thrust ring 30 by any suitable method prior to sliding sleeve 14 over body 12.

Parts of nut 16, for example the threads and the thrust faces, may be selectively hardened by induction hardening or any other suitable method. The nut is therefore sufficiently hard enough to engage jaw threads 38 and drive the jaws in the passageways, yet flexible enough for the nut protrusions to deflect inward around thrust ring 30. The illustrated embodiments contemplate use of a steel nut, at least partially hardened. However, as should be understood by those of ordinary skill in the art, the nut could be formed by other suitable materials and construction. It should also be understood that the present invention encompasses the use of a two-piece nut.

Other methods of holding nut 16 axially with respect to body 12 are contemplated by the present invention. For example, where the chuck includes a separate restraint mechanism holding sleeve 14 axially on the body, such as a nose piece (not shown) press-fit onto body nose section 20 as disclosed in the '473 patent incorporated by reference above, a press-fit between the nut and the sleeve may retain the nut axially with respect to the body.

Figure 5:
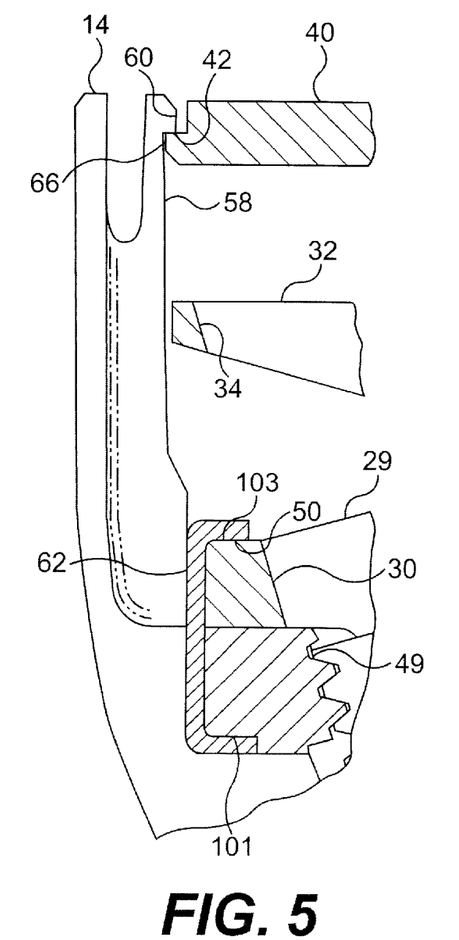
FIG. 5 is a partial cross-sectional view of an embodiment of the present invention including a pressing between the sleeve, the nut, and the body.
Figure 6:
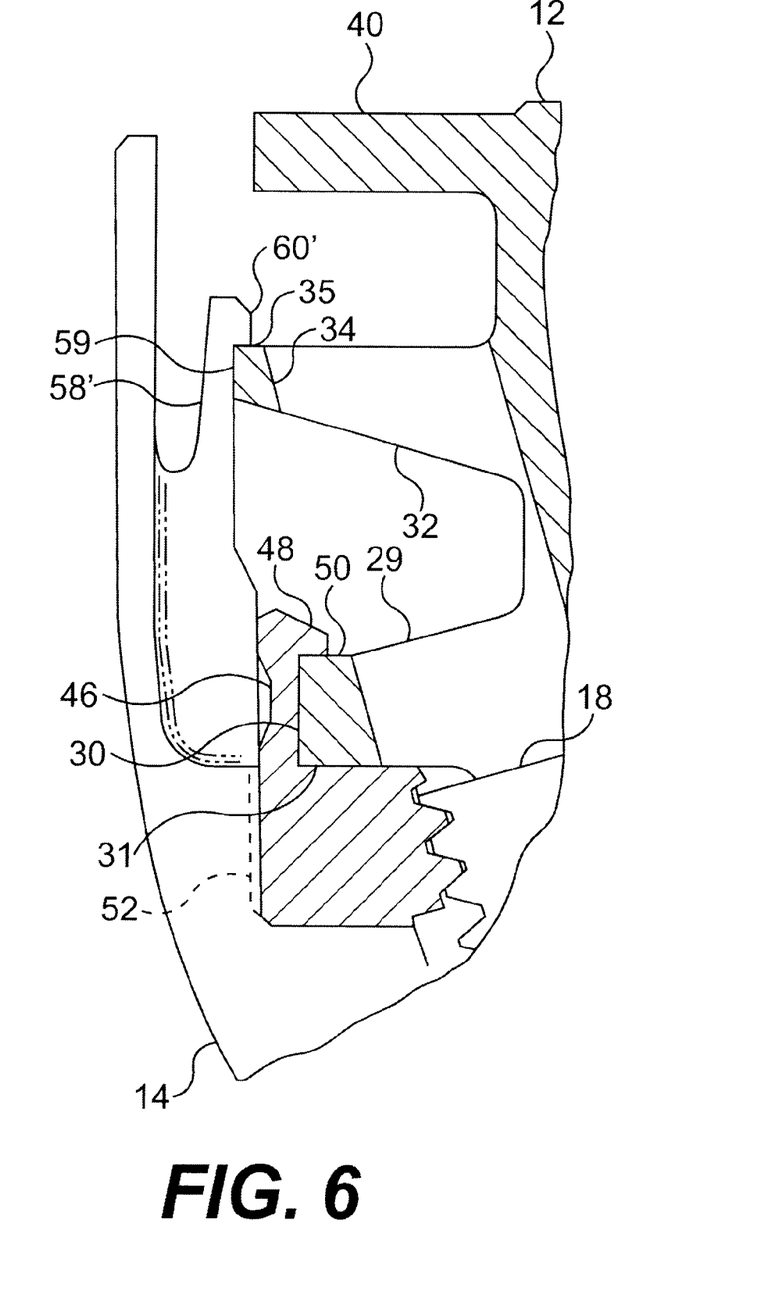
FIG. 6 is a partial cross-sectional view of an embodiment of the present invention showing the sleeve held to an intermediate body flange.

In an embodiment as shown in FIG. 5, the nut may include a generally cylindrical pressing member 49 pressed and crimped to the main portion of the nut at 101 and crimped around thrust ring 31 at 103. As shown, use of pressing member 49 permits a full flange overlap of the pressing member around thrust ring rearward surface 50 at 103. If pressing member 49 is utilized, nut tabs 48 and protrusions 46 may be eliminated, thus permitting through hardening of the main portion of nut 16. Knurled surfaces may be provided on either or both of the pressing member and the main portion of the nut to facilitate a press-fit between the two. Knurled surfaces may also be provided between the nut and sleeve 14 where those components are attached by press-fit. Of course, the sleeve may drive the nut in any suitable manner. For example, a castellated end of the nut may receive dog-drives extending from the sleeve.

Pressing member 49 may have a greater inner diameter at its axially rearward end so that there is a gap between the pressing and the thrust ring. This gap facilitates rotation of the pressing member with respect to the thrust ring, while the smaller inner diamter of the forward end enables a press-fit between the pressing member and the main portion of the nut. Sleeve cam surface 62 may also define a greater diameter about the rear end of the pressing member.

Figure 2:
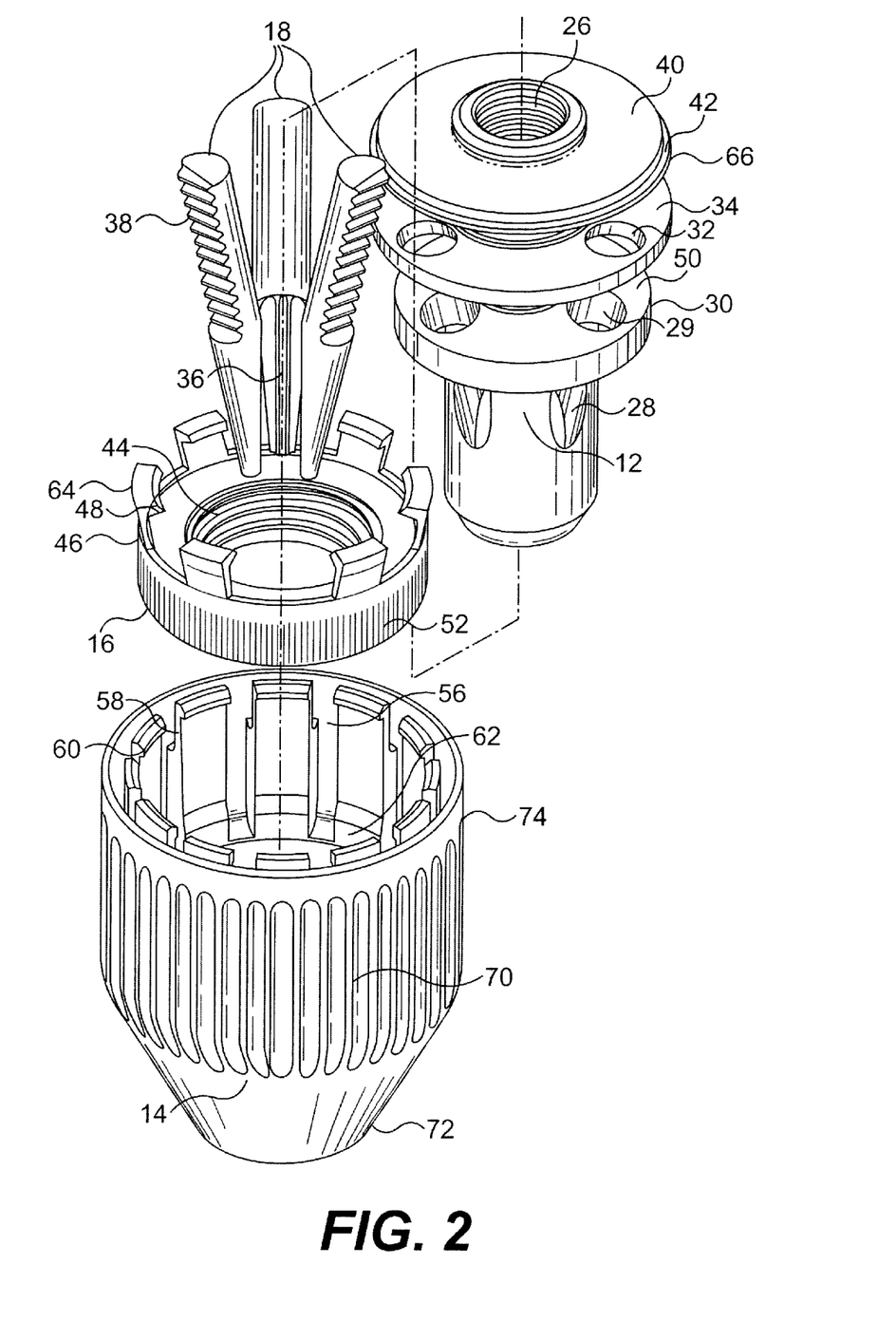
FIG. 2 is an exploded view of the chuck illustrated in FIG. 1.

As shown in FIGS. 1 and 2, sleeve 14 is pressed to a knurled surface 52 on nut 16 so that the sleeve rotationally drives the nut. Furthermore, the press-fit axially retains the sleeve on the chuck. However, as should be understood by one of ordinary skill in the art, sleeve 14 could be attached to nut 16 by any conventional mechanism. For example, sleeve 14 could be held to nut 16 by a press-fit without the use of a knurl or other interference type press-fit, or by staking, riveting, crimping, threading, or by use of a key or any other suitable securing mechanism.

Chuck 10 may include a nose piece as discussed above for decorative purposes or to retain the sleeve in the axial forward direction. A snap ring held in an annular groove in body nose section 20 forward of the sleeve could also be used. The exposed axially forward portion of the chuck, whether it be body nose section 20 or the forward face of a nose piece may include a non-ferrous metallic coating to prevent rust and enhance the chuck's appearance.

An inner circumferential surface 56 on sleeve 14 defines a plurality of axially rearward extending flexible protrusions 58 with radially inward extending tabs 60 thereon. In the embodiment illustrated in FIG. 1, sleeve tabs 60 engage ledge portion 42 on body rear radial flange 40, providing a secondary retention mechanism to hold sleeve 14 axially with respect to body 12. In the embodiments illustrated in FIGS. 6 and 7, sleeve protrusions 58' and tabs 60' are formed closer to sleeve nose section 72 and are held to body 12 at an axially rearward facing surface 35 on intermediate flange 34.

Sleeve 14 and an optional rear sleeve 15, illustrated in FIG. 7 and further described below, may be fabricated from a structural plastic such as polycarbonate, a filled polypropylene, for example glass-filled polypropylene, or a blend of structural plastic materials. Other composite materials, for example graphite filled polymerics, could also be suitable in certain environments. Further, the sleeves may be constructed from other suitable metals, such as steel. As should be appreciated by one skilled in the art, the materials from which the chuck of the present invention are fabricated may depend upon the end use of the chuck, and the above are provided by way of example only. For example, the sleeve or sleeves may be formed from a combination of the above described materials.

Sleeve 14 defines a gripping surface 70 on its outer circumference, illustrated in FIGS. 1 and 2 as a series of longitudinal ribs. However, any suitable gripping surface could be employed for this purpose, for example a knurled surface or a series of protrusions or depressions. Relative rotation between sleeve 14 and body 12 in a single sleeve embodiment of the present invention can be accomplished either by an operator gripping the sleeve and actuating the drive shaft of the driver, or by locking the drive shaft and manually rotating the sleeve. The latter method employs a spindle lock mechanism, for example on the driver or the chuck. Spindle locks are known in the art and any number of such devices could be employed for this purpose.

Figure 7:
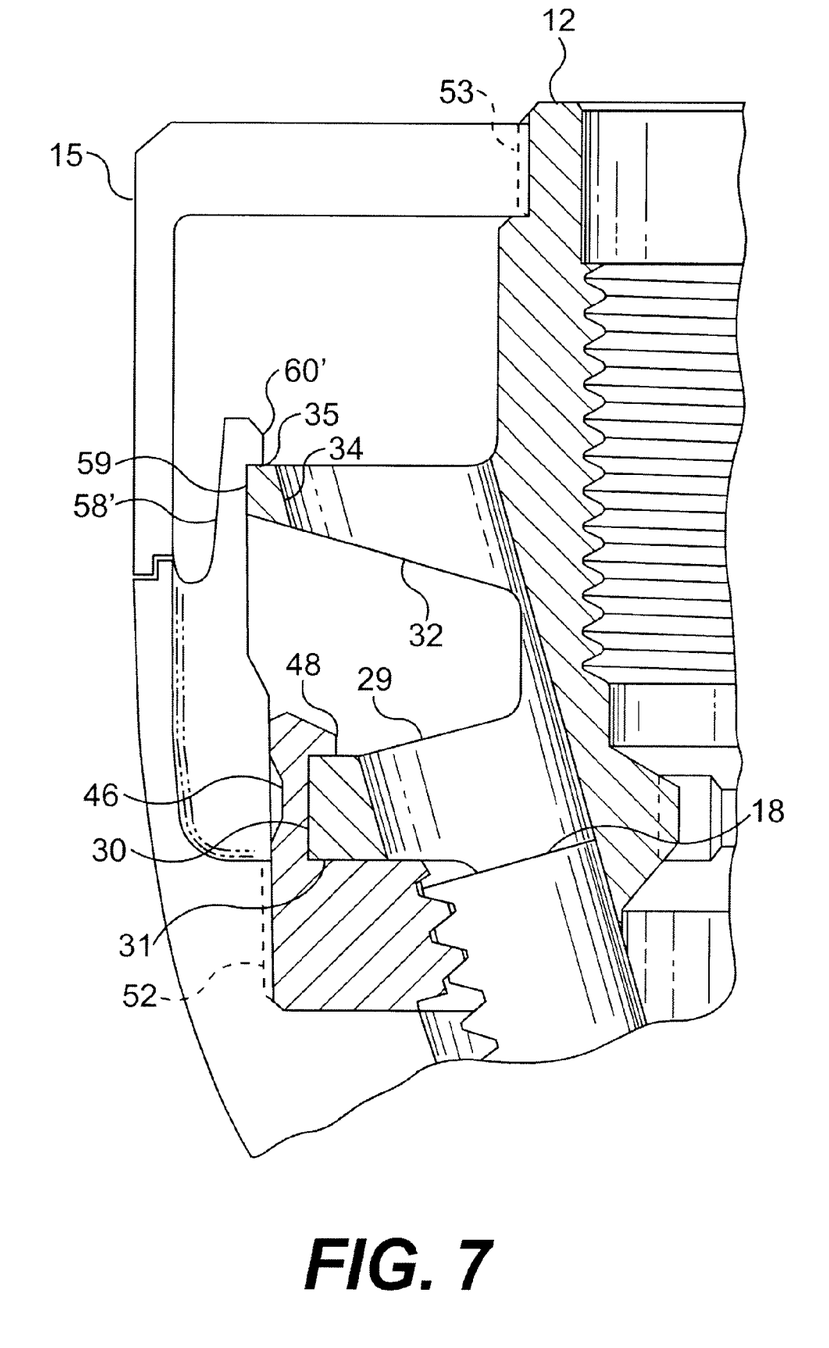
FIG. 7 is a partial cross-sectional view of an embodiment of the present invention including a rear sleeve.

As shown in FIG. 7, chuck 10 may include rear sleeve 15 fixed to body 12. The rear sleeve may include a gripping surface similar to surface 70 on sleeve 14. An operator may grip rear sleeve 15 and rotate sleeve 14 with respect to the rear sleeve to move jaws 18 within passageways 28, 29 and 32. Rear sleeve 15 may be pressed onto a knurled surface 53 of the body, retained in place by a press-fit without knurling, or held in place by crimping, staking, riveting, threading, use of a key or a c-clip, or any other suitable securing mechanism.

Referring still to FIG. 7, sleeve 14 is held to body 12 by engagement of sleeve tabs 60' to an axially rearward facing surface 35 on intermediate flange 34, It should be understood that, similar to protrusions 58 and tabs 60 discussed above, sleeve protrusions 58' and tabs 60' flex radially outward as they pass around nut protrusions 46 and tabs 48 and outer circumferential surface 59 on intermediate flange 34. In a still further embodiment, the rear sleeve may include a ledge portion, similar to ledge portion 42 on body rear flange 40, at its forward end for receipt of tabs 60 of sleeve 14.

Figure 4:
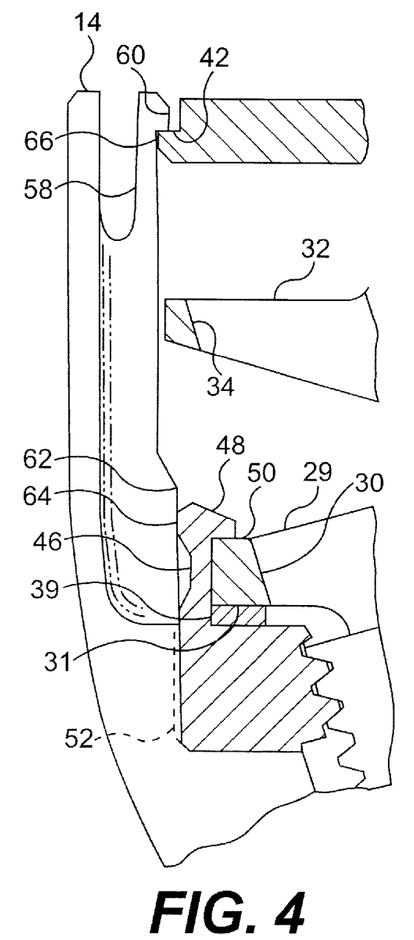
FIG. 4 is a partial cross-sectional view of an embodiment of the present invention including an acetal bearing between the nut and the thrust ring.

As shown in FIG. 4, bearing 39, which is of a suitable lubricated bearing material such as acetal, may be formed by conventional plastic injection molding and may be placed between face 31 of thrust ring 30 and nut 16. In another bearing arrangement, body thrust ring forward face 31 or rearward face 50 may include a seating surface for engagement with the inner race of a self contained anti-friction bearing assembly. An example of such a bearing assembly is disclosed in U.S. Pat. No. 5,348,318, commonly assigned to the present assignee, and the entire disclosure of which is incorporated by reference herein. Where such a bearing is disposed axially rearward of thrust ring 30 between the thrust ring and the nut tabs, nut tabs 48 may engage the bearing race opposite the nut to maintain the bearing in engagement with thrust ring rear seating surface. Furthermore, the interfaces between the nut, the bearing, and the thrust ring may be coated with a dry lubricant.

While one or more preferred embodiments of the present invention have been described above, it should be understood that any and all equivalent realizations of the present invention are included within the scope and spirit thereof. Thus, the depicted embodiments are presented by way of example only and are not intended as limitations on the present invention. It should be understood that aspects of the various one or more embodiments may be interchanged both in whole or in part. Therefore it is contemplated that any and all such embodiments are included in the present invention as may fall within the literal or equivalent scope of the appended claims.

What is claimed is:

1. A chuck for use with a manual or powered driver having a rotatable drive shaft, said chuck comprising:

a generally cylindrical body having a nose section and a tail section, said tail section adapted to rotate with the drive shaft and said nose section having an axial bore formed therein and a plurality of angularly disposed passageways formed therethrough and intersecting said axial bore;

a thrust bearing ring fixed on said body between said nose section and said tail section;

a plurality of jaws slidably positioned in said passageways, each of said jaws having threads formed on one side thereof and a tool engaging surface formed on the opposite side thereof;

a nut rotatably mounted about said body and in engagement with said jaw threads so that rotation of said nut with respect to said body moves said jaws within said passageways, wherein said nut receives said thrust ring so that said thrust ring holds said nut against forward and rearward axial movement with respect to said body and wherein said nut includes a forward portion and a plurality of protrusions that are biased radially outward and that extend axially rearward from said forward portion, said protrusions respectively defining radially inward projecting tabs; and a generally cylindrical sleeve in driving engagement with said nut and having a cam surface that forces said protrusions radially inward so that said tabs close about said thrust ring.

2. The chuck as in claim 1, wherein said cam surface of said sleeve is generally cylindrical.

3. A chuck for use with a manual or powered driver having a rotatable drive shaft, said chuck comprising:

a generally cylindrical body having a nose section and a tail section, said tail section adapted to rotate with the drive shaft and said nose section having an axial bore formed therein and a plurality of angularly disposed passageways formed therethrough and intersecting said axial bore;

a thrust bearing ring fixed on said body between said nose section and said tail section;

a plurality of jaws slidably positioned in said passageways, each of said jaws having threads formed on one side thereof and a tool engaging surface formed on the opposite side thereof;

a nut rotatably mounted about said body and in engagement with said jaw threads so that rotation of said nut with respect to said body moves said jaws within said passageways, wherein said nut receives said thrust ring so that said thrust ring holds said nut against forward and rearward axial movement with respect to said body;

a generally cylindrical sleeve in driving engagement with said nut; and a retaining ring fixed on said body axially rearward of said thrust ring, said retaining ring engaging an inner circumferential surface of said sleeve, wherein an inner circumferential surface of said sleeve includes a plurality of flexible protrusions, said sleeve protrusions having radially inward projecting sleeve tabs that engage an axially rearward facing surface of said retaining ring.

4. A chuck for use with a manual or powered driver having a rotatable drive shaft, said chuck comprising:

a generally cylindrical body having a nose section and a tail section, said tail section adapted to rotate with the drive shaft and said nose section having an axial bore formed therein and a plurality of angularly disposed passageways formed therethrough and intersecting said axial bore;

a thrust bearing ring fixed on said body between said nose section and said tail section;

a plurality of jaws slidably positioned in said passageways, each of said jaws having threads formed on one side thereof and a tool engaging surface formed on the opposite side thereof;

a nut rotatably mounted about said body and in engagement with said jaw threads so that rotation of said nut with respect to said body moves said jaws within said passageways, wherein said nut receives said thrust ring so that said thrust ring holds said nut against forward and rearward axial movement with respect to said body;

a generally cylindrical sleeve in driving engagement with said nut; and an intermediate radial flange fixed to said body axially rearward of said thrust bearing ring, said intermediate flange defining a plurality of passageways that receive said jaws when said chuck is in a fully open position.

5. The chuck as in claim 4, wherein said intermediate radial flange is formed integrally with said body.

6. The chuck as in claim 4, wherein an inner circumferential surface of said sleeve includes a plurality of flexible protrusions, said sleeve protrusions having radially inward projecting tabs that engage an axially rearward facing surface of said intermediate radial flange.

7. A chuck for use with a manual or powered driver having a rotatable drive shaft, said chuck comprising:

a generally cylindrical body having a nose section and a tail section, said tail sect ion adapted to rotate with the drive shaft and said nose section having an axial bore formed therein and a plurality of angularly disposed passageways formed therethrough and intersecting said axial bore;

a thrust bearing ring fixed on said body between said nose section and said tail section;

a plurality of jaws slidably positioned in said passageways, each of said jaws having threads formed on one side thereof and a tool engaging surface formed on the opposite side thereof;

a nut rotatably mounted about said body and in engagement with said jaw threads so that rotation of said nut with respect to said body moves said jaws within said passageways, wherein said nut receives said thrust ring so that said thrust ring holds said nut against forward and rearward axial movement with respect to said body;

a generally cylindrical sleeve in driving engagement with said nut;

a retaining ring fixed on said body axially rearward of said thrust ring, said retaining ring engaging an inner circumferential surface of said sleeve; and a second sleeve fixed on said body axially rearward of said thrust ring.

8. A chuck for use with a manual or powered driver having a rotatable drive shaft, said chuck comprising:

a generally cylindrical body having a nose section and a tail section, said tail section adapted to rotate with the drive shaft and said nose section having an axial bore formed therein and a plurality of angularly disposed first passageways formed therethrough and intersecting said axial bore, wherein said body includes a thrust bearing ring fixed to said body axially rearward of said nose section, said thrust ring defining an axially rearward facing surface and an axially forward facing surface and a plurality of second passageways formed therethrough, said body including a first radial flange axially rearward of said thrust bearing ring, said first radial flange defining an axially rearward facing surface;

a plurality of jaws slidably positioned in said first and second passageways, each said jaw having threads formed on one side thereof and a tool engaging surface formed on the opposite side thereof;

a nut rotatably mounted about said body in engagement with said jaw threads so that rotation of said nut with respect to said body moves said jaws within said first and second passageways, said nut including a forward portion and a plurality of protrusions that extend axially rearward of said forward portion, said protrusions respectively defining radially inward projecting tabs, wherein said thrust bearing ring is received between said forward portion and said nut tabs;

a generally cylindrical sleeve in driving engagement with said nut; and a second radial flange between said thrust ring and said first radial flange, wherein said second flange is fixed to said body and defines a plurality of third passageways that receive said jaws when said chuck is in the fully open position.

9. A chuck for use with a manual or powered driver having a rotatable drive shaft, said chuck comprising:

a generally cylindrical body having a nose section and a tail section, said tail section adapted to rotate with the drive shaft and said nose section having an axial bore formed therein and a plurality of angularly disposed first passageways formed therethrough and intersecting said axial bore, wherein said body includes a thrust bearing ring fixed to said body axially rearward of said nose section, said thrust ring defining an axially rearward facing surface and an axially forward facing surface and a plurality of second passageways formed therethrough, said body including a first radial flange axially rearward of said thrust bearing ring, said first radial flange defining an axially rearward facing surface;

a plurality of jaws slidably positioned in said first and second passageways, each said jaw having threads formed on one side thereof and a tool engaging surface formed on the opposite side thereof;

a nut rotatably mounted about said body in engagement with said jaw threads so that rotation of said nut with respect to said body moves said jaws within said first and second passageways, said nut including a forward portion and a plurality of protrusions that are biased radially outward and that extend axially rearward of said forward portion, said protrusions respectively defining radially inward projecting tabs, wherein said thrust bearing ring is received between said forward portion and said nut tabs; and a generally cylindrical sleeve in driving engagement with said nut.

10. The chuck as in claim 9, wherein said sleeve includes a radially inward facing cam surface that engages said nut protrusions to hold said nut tabs radially inward of an outer circumference of said thrust ring rearward surface.

11. A chuck for use with a manual or powered driver having a rotatable drive shaft, said chuck comprising:

a generally cylindrical body having a nose section and a tail section, said tail section adapted to rotate with the drive shaft and said nose section having an axial bore formed therein and a plurality of angularly disposed first passageways formed therethrough and intersecting said axial bore;

a thrust bearing ring fixed on said body between said nose section and said tail section, said thrust ring defining an axially rearward facing surface and an axially forward facing surface and a plurality of second passageways defined therethrough;

an intermediate radial flange fixed on said body axially rearward of said thrust bearing ring, said intermediate flange defining a plurality of third passageways;

a retaining ring fixed on said body axially rearward of said thrust ring;

a plurality of jaws slidably positioned in said passageways, each of said jaws having threads formed on one side thereof and a tool engaging surface formed on the opposite side thereof;

a nut rotatably mounted about said body in engagement with said jaw threads so that rotation of said nut with respect to said body moves said jaws within said passageways, said nut including a forward portion and a plurality of protrusions that extend axially rearward of said forward portion, said protrusions respectively defining radially inward projecting tabs, wherein said thrust bearing ring is received between said forward portion and said nut tabs; and a generally cylindrical sleeve in driving engagement with said nut, said sleeve defining a plurality of flexible protrusions extending axially rearward from an inner circumferential surface of said sleeve, said sleeve protrusions defining radially inward projecting tabs, said sleeve including a radially inward facing cam surface, wherein said nut protrusions are biased radially outward and wherein said sleeve cam surface forces said protrusions radially inward so that said tabs close about said thrust ring, and wherein said axially rearward facing surface of said retaining ring receives said sleeve tabs to hold said sleeve against forward axial movement with respect to said body.

* * * * *